March 20, 1945. C. H. SCHRODER 2,371,929
GAS GENERATOR
Filed Aug. 3, 1940 2 Sheets-Sheet 1

Inventor:
Charles H. Schroder,
by J. H. McCurdy,
Attorney

March 20, 1945. C. H. SCHRODER 2,371,929
GAS GENERATOR
Filed Aug. 3, 1940 2 Sheets-Sheet 2
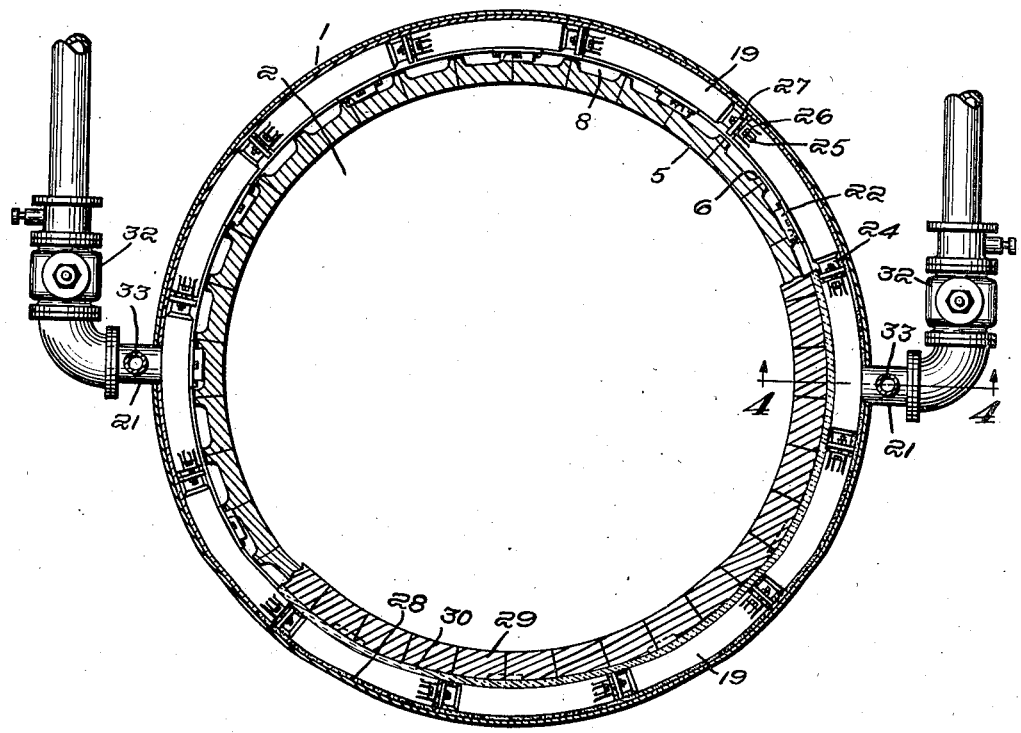
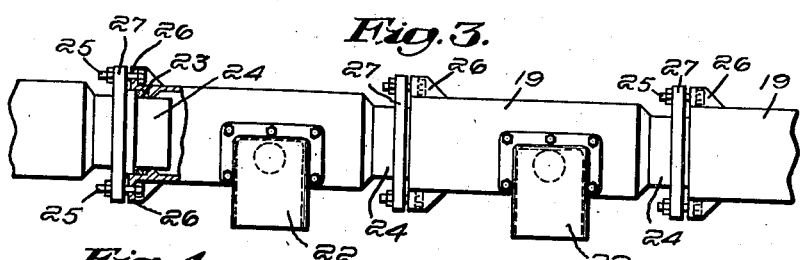
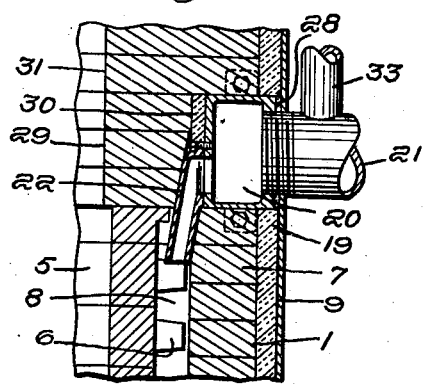
Inventor:
Charles H. Schroder,
by J. H. McCready,
Attorney Patented Mar. 20, 1945

2,371,929

UNITED STATES PATENT OFFICE 2,371,929

GAS GENERATOR

Charles H. Schroder, Philadelphia, Pa., assignor to Bernitz Furnace Appliance Company, Boston, Mass., a corporation of Massachusetts Application August 3, 1940, Serial No. 351,023

10 Claims. (Cl. 48—78)

This invention relates to water gas generator apparatus and aims especially to improve the facilities for cooling the refractory lining surrounding the fuel bed of the generator. It is customary in such apparatus to build the refractory generator lining hollow and allow cooling fluids, usually air and steam, to circulate therethrough for the purpose of prolonging the life of the lining and to make it clinker resistant.

Upon passing through the lining the cooling fluid extracts a considerable amount of heat from the lining and becomes highly superheated. The heat thus absorbed is thereupon made use of in the gas making process to improve the capacity and efficiency of the apparatus.

One such cooling system is shown and described in a joint invention by Oscar Nygaard and myself on which an application for a U. S. patent has been filed of even date herewith entitled "Cooling system for water gas generator linings," and this invention seeks particularly to improve upon some of the structural features shown in that co-pending application.

One object of this invention is to effect a more efficient and even distribution of the cooling fluid to the hollow generator lining. Other objects are to reduce all outside piping to the minimum, simplify construction, and reduce cost.

These and other objects will be readily understood from the following description when read in connection with the accompanying drawings, and the novel features will be particularly pointed out in the appended claims.

In the drawings,

Fig. 2 is a cross-sectional view taken on line 2—2 of Fig. 1, with a portion of the inner lining brick removed to show the circulation space for the cooling fluid which is located on a lower level, and the high heat-conductive lining blocks on the front or inner side of the space;

Fig. 3 is a fragmentary elevational view of the sectional manifold, the plan view of which is shown in Fig. 2; and Fig. 4 is an enlarged vertical cross-sectional view on the line 4—4 of Fig. 2.

Figure 1:
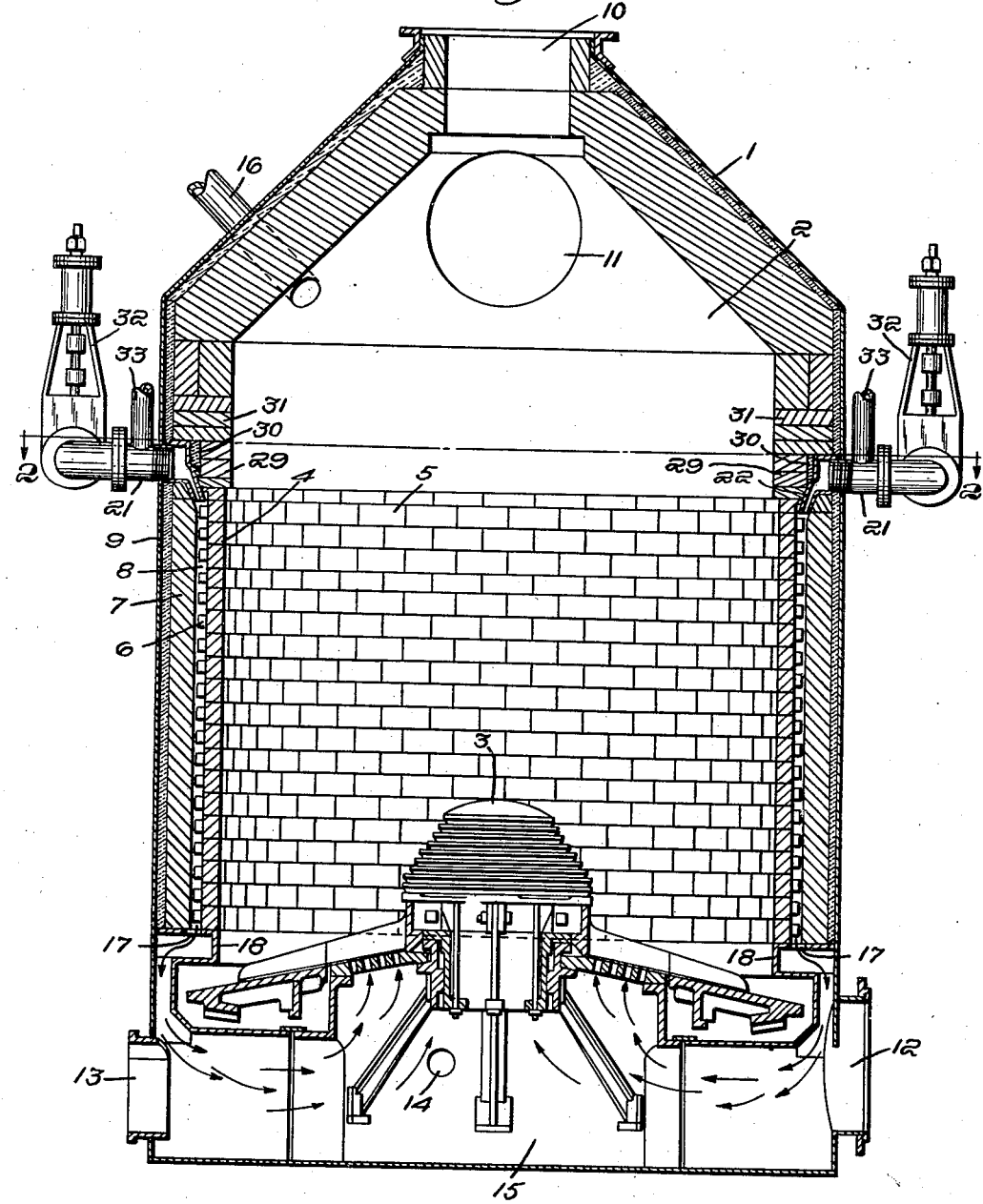
Fig. 1 is a vertical cross-sectional view of a water gas generator in accordance with this invention.

In the drawings like numbers indicate like parts. Referring now especially to Figs. 1 and 2; 1 represents the outer circular shell or casing of the generator, 2 the interior space thereof wherein the gas is made. When the generator is in operation a fuel bed supported on the automatic self-cleaning grates 3 normally fills the space to the height of the inner concentric lining section 4, composed of high heat-resisting blocks 5 which are capable of rapid heat transfer and which surround and laterally confine the fuel bed. The inner lining blocks 5 have lugs 6 which space the inner lining section 4 from an outer lining section 7, thereby forming an annular space 8 for circulation of cooling fluid therethrough. A layer of insulating material 9 between the shell 1 and the lining 7 further protects the shell from the heat of the fuel bed.

In the top of the generator, opening 10 is for charging the interior of the generator with fuel, while openings 11 and 12 are for drawing off the gas made during the uprun and downrun respectively. Opening 13 admits blast air, and 14 steam to the ash pit space 15 below the grates, while pipe 16 is for admitting steam to the interior of the generator above the fuel bed. The annular space between lining sections 4 and 7 is in communication with the ash pit 15 through a multiplicity of holes 17 in the top plate of the box-shaped supporting member 18.

Figs. 2 and 4 in particular show clearly a manifold 19 composed of a plurality of connected hollow telescopic members or sections, forming a complete ring laid up within the outer lining section 7, and positioned above the inner lining blocks 5. The manifold is preferably shown in rectangular cross-sectional form, having a width approximately the same as the outer lining brick and being several brick courses high. While the rectangular form is convenient for laying up in the brick lining, it will be understood that circular or any other form of cross section that will give the desired area of opening or continuous passage 20 will serve the purpose equally well.

The manifold is provided with one or several inlets 21, two being shown in Fig. 2, and each section is provided with one or more renewable outlet nozzles 22 which enter the top of the annular space 8 in the refractory lining. Thus a multiplicity of feeding points to the annular space in the lining is obtained at spaced intervals to insure an even cooling of the lining.

Another important feature of this manifold combination is that the nozzles 22 are so constructed and located that the cooling fluid for the lining will be discharged in the direction of the flow downward toward the ash pit, thus avoiding impingement on the lining blocks 5 and also greatly reduce frictional losses.

While in the drawings the nozzles 22 have been shown renewable I might find it expedient to exclude this feature and instead elect to make them integral with the main body of the manifold section to reduce cost.

As will be understood from the drawings, the various sections of the manifold telescope each other to form a continuous annular passage, and any one of such sections being adapted to receive inlet pipes 21. In order to insure tightness one end of each section is formed to make a stuffingbox for holding packing material 23, the other end having a reduced portion 24 which telescopes the stuffingbox end of the next succeeding section. By means of the bolts 25—25 and cooperating lugs or flanges 26—26, the gland 27 can be pulled up to compress the packing in the stuffingbox to the desired tightness.

When the manifold 19 is erected in place a small space will usually be had between it and the shell or casting 1 which is filled with packing or insulation material 28. The refractory lining brick 29 shields the manifold from the heat of the fire, but as a further precaution a layer of good grade of insulation material 30 is applied on the inner side of the manifold between it and the lining brick 29. Several courses of header brick 31 bond the inner and outer lining sections together and form a seal over the manifold 19.

In the drawings only fragmentary views are shown of the inlet pipes for the manifold, but it will be understood that connections are contemplated that will insure a full and adequate supply of cooling fluid. The inlet pipes 21 may be connected to and derive a supply of air from the main air blast pipes to the generator connected at 13 or they may be connected to a separate independent blower.

When the inlets are taken from the main air blast connections, each of the inlets may be equipped with a stop valve 32 which may be fitted for hydraulic operation, and it is customary to connect all of such valves in a manner to insure operation from one control point so that they will open and close in unison; the inlets 21 may also be connected into a common header with one stop valve controlling all the inlets.

Steam may also be used for cooling the generator lining during the uprun and purging periods of the operating cycle and connections 33—33 placed close to the stop valves 32—32 are usually provided so that all connections as well as the manifold and annular space within the generator lining can be purged back to the control valve or valves.

Whereas in the drawings the manifold is shown located within the interior of the generator, the essential features of the manifold can be used if it was located on the outside of the generator, only minor changes in the construction of the nozzles as shown being required to make the location outside practical.

It will also be understood that although the various sections of the manifold are shown telescoping each other, they could be equipped with abutting flanges with packing material between the flanges to insure tightness, any movement of the manifold due to expansion or contraction would in that case be taken care of by compression of the comparatively soft insulation material located on either side of the manifold.

Having thus illustrated and described my invention, what I desire to secure by claims and Letters Patent is:

1. In a water gas generator of the circular type, a refractory lining forming a concentric wall for laterally confining the fuel bed on the grates and having an annular space therein in communication with the generator ash pit below the grates, a manifold mounted in said lining for supplying a cooling fluid for circulation through said space, said manifold being composed of a plurality of hollow sections telescopically connected together, at least one of which sections is equipped with an inlet for admission of the cooling fluid to the interior thereof and means connecting said manifold with said annular space and serving to conduct fluid from one to the other.

2. In a water gas generator of the circular type, a refractory lining forming a concentric wall for laterally confining the fuel bed on the grates and having an internal annular space in communication with the generator ash pit below the grates, a manifold mounted in said lining for supplying a cooling fluid for circulation through said internal space, said manifold being built up from a plurality of hollow elongated separate sections telescopically connected together, means for receiving cooling fluid for passage through said sections, some at least of said sections having downwardly pointing nozzle outlets opening into said internal space.

3. In a water gas generator of the circular type, a refractory lining forming a concentric wall for laterally confining the fuel bed on the grates and having an internal annular space in communication with the generator ash pit below the grates, a manifold mounted in said lining for supplying a cooling fluid for circulation through said internal space, said manifold being built up from a plurality of hollow elongated separate sections telescopically connected together, means for receiving cooling fluid for passage through said sections, some at least of said sections having renewable downwardly pointed nozzles opening into said internal space.

4. In a water gas generator of the circular type, a refractory lining forming a concentric wall for laterally confining the fuel bed on the grates and having an annular internal space terminating in a multiplicity of openings to the generator ash pit below the grates, a manifold mounted in said lining for supplying a cooling fluid for circulation through the annular space, said space being approximately on the level with and of a height approximately that of the fuel bed, said manifold comprising a plurality of hollow elongated sections connected together telescopically and forming a ring having a continuous passage for the flow of fluids therethrough, at least one of said sections being equipped with an air and steam inlet.

5. In a water gas generator of the circular type, a refractory lining forming a concentric wall for laterally confining the fuel bed on the grates having an annular internal space and said space having several openings in communication with the generator ash pit below the grates, a manifold in connection with the generator for supplying a cooling fluid for circulation through the annular space, said manifold being located in the refractory lining and having several outlets to the interior of said annular space, said manifold comprising a plurality of sections telescopically connected together, at least one of said sections having means for receiving cooling fluid for circulation within the manifold.

6. As in claim 4 and, all of said sections having means to effect a leakproof joint.

7. As in claim 5 and, said sections being equipped with stuffingboxes and packing material to prevent leakage between the sections.

8. As in claim 5, and means to compensate for any movement of said manifold due to expansion and contraction on account of temperature differentials.

9. In a water gas generator of the circular type, a refractory brick lining forming a concentric wall for laterally defining the fuel bed on the grates having an annular internal space and said space having several openings in communication with the interior of the generator ash pit below the grates, a manifold in connection with the generator for supplying a cooling fluid for circulation through the annular space, said manifold being located in said refractory brick lining and having several outlets to the interior of said annular space, said manifold comprising a plurality of hollow elongated independent sections connected together telescopically, at least one of said sections having means for receiving cooling fluid for circulation within the manifold, header courses of refractory brick above said manifold for supporting and bonding the inner and outer lining sections forming the boundary of said internal annular space and to form a seal over the manifold to prevent leakage through the brick wall above said annular space to the interior of the generator.

10. In a water gas generator of the circular type, a fire grate separating the internal space thereof into an ash pit below the grate and a fuel and combustion space above the grate, a refractory brick lining forming a concentric wall defining the lateral limits of said ash pit and said fuel and combustion space, said wall comprising an inner fire face lining made of high heat conductive material and an outer lining made of comparatively low heat conductive material, said inner and outer lining being spaced apart to form an annular space closed at about the level of the normal height of the fuel bed and terminating at the bottom in a plurality of openings to the ash pit below the grates, a manifold for carrying a cooling fluid in connection therewith, said manifold being composed of a plurality of hollow elongated members telescopically connected together to form a continuous passage for the cooling fluid, means for feeding cooling fluid from the manifold in a downward direction into said annular space, and the manifold being located in the lining near the top of said annular space, and means for connecting the manifold through the shell of the generator to a source of cooling fluid supply.

CHARLES H. SCHRODER.